United States Patent [19]

Mabb

[11] 4,399,081

[45] Aug. 16, 1983

[54] APPARATUS FOR AERATING LIQUIDS

[75] Inventor: Kenneth G. Mabb, Peterborough, England

[73] Assignee: Sodastream Limited, Peterborough, England

[21] Appl. No.: 296,423

[22] PCT Filed: Jan. 2, 1981

[86] PCT No.: PCT/GB81/00001
§ 371 Date: Aug. 19, 1981
§ 102(e) Date: Aug. 19, 1981

[87] PCT Pub. No.: WO81/01945
PCT Pub. Date: Jul. 23, 1981

[30] Foreign Application Priority Data

Jan. 15, 1980 [GB] United Kingdom ................ 8001355

[51] Int. Cl.³ .............................................. B01F 3/04
[52] U.S. Cl. ................................. 261/121 R; 74/526; 99/323.1; 141/278; 261/DIG. 7; 426/477
[58] Field of Search ............ 261/121 R, 122, DIG. 7; 426/474, 477; 99/323.1, 323.2; 141/19, 97, 150, 278, 250-254, 257-262, 377, 369; 74/526

[56] References Cited

U.S. PATENT DOCUMENTS

| 913,656 | 2/1909 | Giron | 141/278 |
| 2,415,419 | 2/1947 | Cozzoli | 141/278 |
| 2,508,142 | 5/1950 | Brothman | 141/278 |
| 3,139,769 | 7/1964 | Gauchat | 74/526 |
| 3,390,921 | 7/1968 | Klimek | 74/526 |
| 4,298,551 | 11/1981 | Adolfsson et al. | 261/DIG. 7 |

FOREIGN PATENT DOCUMENTS

| 2461373 | 11/1975 | Fed. Rep. of Germany . |
| 501343 | 4/1920 | France . |
| 673920 | 1/1930 | France . |
| 755718 | 11/1933 | France ................ 141/278 |
| 1453363 | 10/1976 | United Kingdom ......... 261/DIG. 7 |
| 2046112 | 11/1980 | United Kingdom . |

Primary Examiner—Richard L. Chiesa
Attorney, Agent, or Firm—Watson, Cole, Grindle & Watson

[57] ABSTRACT

A portable apparatus for aerating liquids includes an aerating head, a mechanism for supplying gas to the aerating head from a cylinder when a control button is depressed, a platform for lifting a bottle containing liquid to be aerated into sealing engagement with the aerating head, and a rotary cam operable by a handle to raise and lower the platform. A pre-compressed coil compression spring is interposed between the platform and a button engaged with the cam to ensure adequate sealing pressure between the bottle and aerating head.

5 Claims, 4 Drawing Figures

APPARATUS FOR AERATING LIQUIDS

FIELD OF THE INVENTION

This invention is concerned with portable apparatus for aerating liquids, and in particular to apparatus of the same general type as that described in our British Pat. No. 1,453,363.

DESCRIPTION OF THE PRIOR ART

In the known apparatus which is disclosed in our earlier British Pat. No. 1,453,363, a bottle containing liquid to be carbonated is, after being loaded into the machine, raised into sealing engagment with an aerating head by a platform. The platform itself is lifted by a cam mechanism which is mounted within the machine casing and is rotated by means of a handle fast with the cam shaft outside the housing. The platform has an integral rigid stem which bears against the cam. As the handle is turned to raise the bottle, the cam rotates lifting the platform and bottle until the top of the bottle bears against the seal of the aerating head. Continued turning of the handle to its limit position causes further rotation of the cam, but because the bottle and platform cannot be raised any further the cam is deflected downwardly. When the bottle is pressurised during the carbonating process, the gas pressure generated in the air space above the liquid in the bottle produces an additional downward force on the bottle and its supporting platform with the result that the cam mechanism undergoes further deflection. The repeated bending of the cam shaft caused by the downward deflection of the cam is, of course, an undesirable effect arising due to the rigidity of the bottle raising mechanism. A further disadvantage can arise because the glass bottles for the liquid can only be made to a certain height tolerance, and short bottles may not be lifted high enough by the lifting mechanism to form an effective seal with the aerating head.

SUMMARY OF THE INVENTION

The present invention aims at eliminating these drawbacks of the known machine and accordingly provides a portable apparatus for aerating liquids, comprising an aerating head, means for supplying gas to the aerating head, a platform for lifting a bottle containing liquid to be aerated into sealing engagement with the aerating head, means operable to raise the platform, and a resiliently compressible element interposed between the raising means and the platform, the element being arranged to be compressed when a bottle is lifted into engagement with the aerating head whereby to ensure adequate sealing pressure between the bottle and the aerating head.

As the compressible element is arranged to be compressed any need for a cam or other component of the platform raising means to deflect is avoided. As a result the platform raising means may comprise a completely rigid cam mechanism while an adequate seal is ensured between the bottle and aerating head each time the apparatus is used.

The compressible element is preferably a coil spring and precompressed so that on operation of the raising means it is only compressed further after the bottle has engaged the aerating head with a predetermined force.

The spring may conveniently consist of a coil spring which is held captive in a tubular stem integral with the platform by an annular plug screwed to the stem, a button slidable in the stem being urged downwardly by the spring and protruding through the plug to engage the cam.

In a preferred embodiment of the invention, the platform raising means comprises a rotary cam which is actuated by a handle located outside a casing of the apparatus, and rotation of the handle is limited by a projection, e.g. a pin which is fixed to the handle or casing and engages in an arcuate slot in the other of the handle or casing so as to move along the slot as the handle is turned whereby rotation of the handle is limited by the pin engaging the opposite ends of the slot.

In a preferred arrangement two fixed pins protrude from the casing and are diametrically opposite each other with respect to the handle axis. The pins are received in respective slots in the handle and an aperture in the handle allows one of the pins to be seen when the handle is in the correct position for a bottle in the apparatus to be properly engaged with the aerating head.

BRIEF DESCRIPTION OF THE DRAWINGS

A more complete understanding of the invention will be had from the following detailed description given by way of example with reference to the drawings, in which.

DETAILED DESCRIPTION OF THE PREFERRED EMBODIMENT

Figure 1:
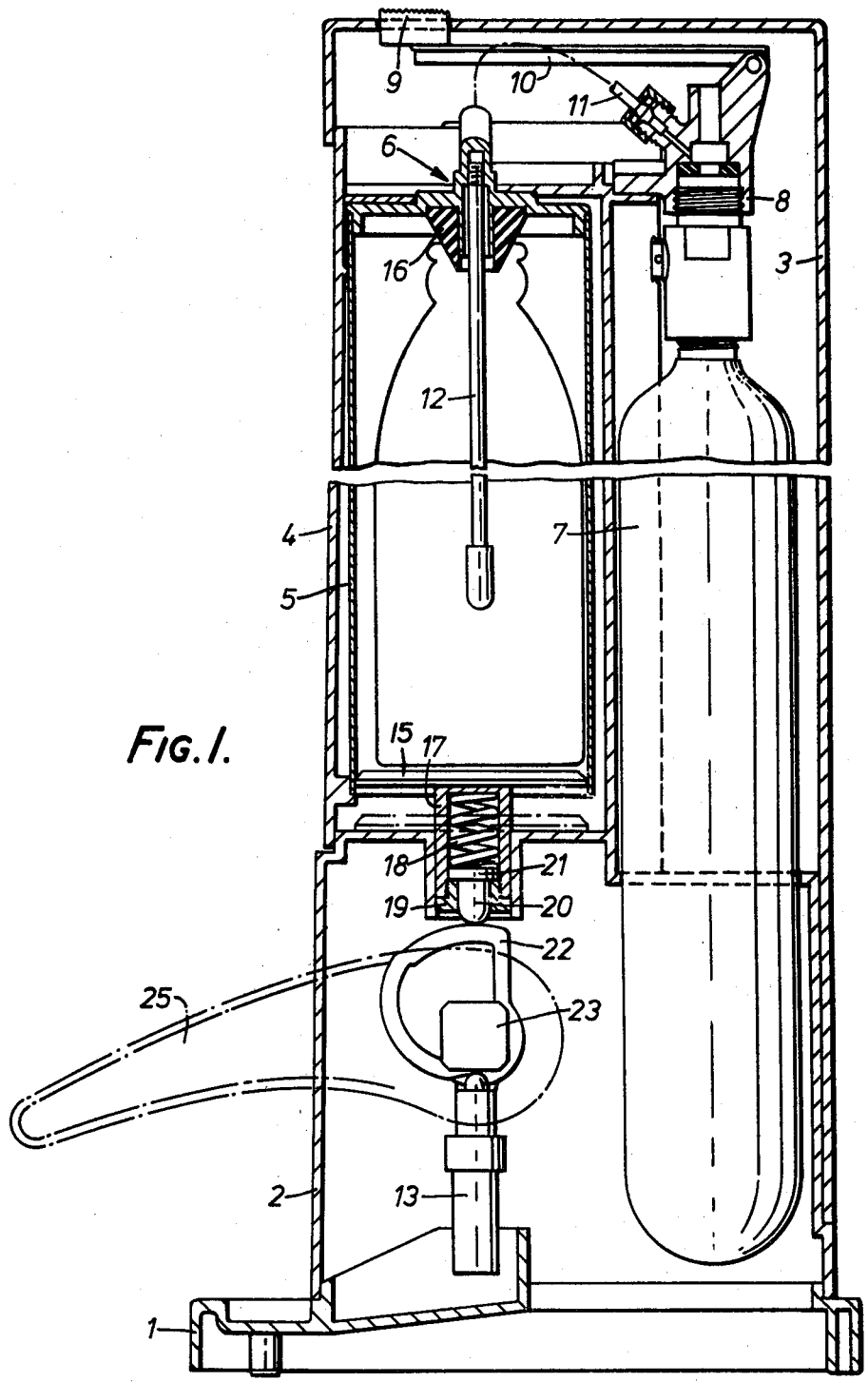
FIG. 1 is a vertical section through a liquid aerating machine embodying the invention.

The illustrated liquid aerating machine is of similar basic construction as that described in British Pat. No. 1,453,363. It comprises a housing made up of a base 1, main part 2, releasable part 3, and a part 4 hinged at its upper end to the main part 2. Housing part 4 includes a tube 5 which is open at its lower end and carries an aerating head 6. A gas bottle 7 is shown mounted in the housing and is supported by a connector 8 into which the bottle neck is screwed. A button 9 projects through a hole in the top of the casing and is carried by a lever 10 adapted to depress a plunger (not shown) to open the valve of the gas bottle 7 when the button 9 is depressed. Gas escaping from the bottle 7 is conducted through a flexible tube 11 to a hollow rod 12 of the aerating head for delivering the gas into the body of liquid contained in a bottle placed in the tube 5. The interior space of the aerating head is connected to atmosphere via a pressure relief valve 13 mounted in the bottom of the casing.

A platform 15 is provided for lifting a bottle placed in tube 5 into sealing engagement with the seal 16 of the aerating head, the platform engaging in the lower end of tube 5 to prevent the housing part 4 from being tilted outwardly when the platform is raised. The platform 15 has an integral, tubular stem 17 which is vertically slidable in a tubular spigot of the main housing part 2. A coil compression spring 18 is received within the stem 17 and is held captive therein by an annular plug 19 which has a screw-threaded connection with the open end of stem 17. A button 20 protrudes through the central hole of plug 19 and has a flange 21 engaged between the plug 19 and spring 18 so that the button is urged downwardly to a lowermost end position with respect to the stem, but is held captive within the stem.

Figure 2:
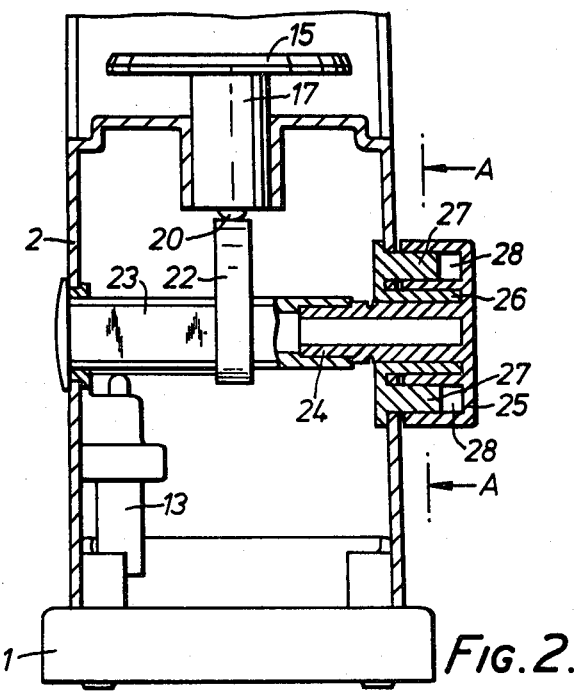
FIG. 2 is a vertical section through the lower end of the machine and in a plane at right angles to that of FIG. 1.

A cam 22 for raising and lowering the platform 15 is mounted on a rigid shaft 23 of rectangular section having one of its ends journalled in one side of the main housing part 2, and its opposite end fast with a spigot 24 (FIG. 2) journalled in the other side of housing part 2 and integral with an operating handle 25, located outside the housing. It may be noted here that the cam shaft 23 also serves to operate the pressure relief valve 13. The handle 25 is journalled in the housing by an insert 26 which includes a tubular journal and a pair of pins 27 located on diametrically opposite sides of the axis of the handle and cam shaft. The pins 27 protrude from the casing and engage in respective arcuate slot 28 formed in the inner surface of the handle. The pins serve to limit turning movement of the handle 25 between the two extreme positions shown in FIGS. 3a and 3b. The handle 25 is provided with a viewing aperture 29 through which one of the pins 27, which are of different colour to the handle, can be seen when the handle is in the platform raised position shown in FIG. 3b.

The operation of the liquid aerating machine is essentially the same as that of the known machine described in British Pat. No. 1,453,363. With the platform 15 lowered, the lower end of housing part 4 can be tilted forwards to allow a bottle containing liquid to be aerated to be inserted into the tube 5, after which part 4 is returned to the illustrated position. The handle is turned in the direction from the FIG. 3a position towards that of FIG. 3b and rotates the cam 22 to lift the platform 15 and raise the bottle into sealing engagement with the seal 16 of the aerating head 6. The precompression of spring 18 is selected so that there is no retraction of the button 20 into the stem 17 until the bottle engages the seal, after which the spring 18 can compress to take up further upward displacement of button 20 caused by cam 22. When the platform is raised, the stop pins 27 engage the ends of their slots 28 to prevent continuing rotation of the handle 25. The fact that one of the pins 27 can be seen through the viewing aperture 29 provides a visual indication that the handle is in the correct operating position. Gas can now be introduced into the bottle by depressing the button 9.

Figure 3A:
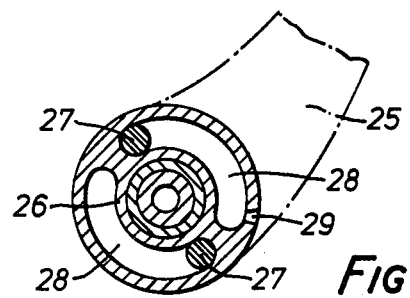
FIGS. 3a and 3b are sections taken along the line A—A of FIG. 2 with the handle shown in the inoperative and operative positions respectively.
Figure 3B:
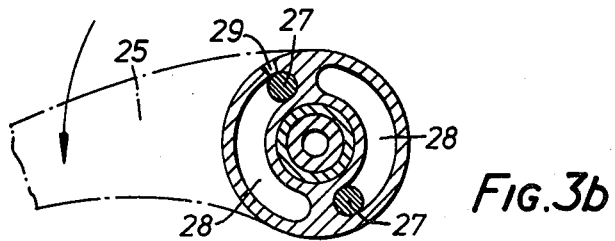

When the liquid is sufficiently aerated, the handle is turned back towards the FIG. 3a position causing cam shaft 23 to open the relief valve 13 to release the gas pressure above the liquid in the bottle, and then to lower the platform 15 (to that position shown in broken line in FIG. 1) so that the bottle of aerated liquid can be removed by tilting the housing part 4 outwardly.

The resilient construction of the platform stem allows the cam mechanism to be completely rigid, and ensures that all bottles, within manufacturing tolerances, will seal adequately against the aerating head. The stop arrangement for limiting handle rotation is completely hidden so that the appearance of the machine is not impaired by stops or projections on the exterior of the housing.

Obviously, numerous modifications and variations of the present invention are possible in light of the above teachings. it is therefore to be understood that within the scope of the appended claims, the invention may be practiced otherwise than as specifically described herein.

I claim:

1. In a portable apparatus for aerating liquids comprising a casing, an aerating head mounted to the casing and including a nozzle and seal means surrounding the nozzle, gas supply means connected to the aerating head and operable to supply gas to said nozzle, a platform for supporting and contacting a bottle having an open mouth and containing lquid to be aerated, means for raising the platform to lift the mouth of said bottle into sealing engagement with said seal means, said platform raising means including rotary cam means supported rotatably on a cam shaft in the casing, an operating member located oustide the frame means and coupled to the cam means for rotating the cam means manually, and a cam follower connected to the platform and in cooperating engagement with the cam means, the improvement which comprises a tubular stem slidable within said casing and fixed to the platform and extending downwardly therefrom having upper and lower abutment surfaces spaced apart and facing towards each other, a coil spring compressed within said tubular stem between the abutment surfaces, the cam follower being slidably and resiliently mounted to said tubular stem and including a flange received within said tubular stem between the lower abutment surface and the adjacent end of the spring, the coil spring being precompressed to a predetermined value between the upper abutment surface and the cam follower to urge the flange against the lower abutment surface, and the spring being adapted to become further compressed when the bottle mouth engages the seal means with a predetermined force and said flange moves out of engagement with the lower abutment surface on raising the platform, whereby to ensure a tight seal between the bottle mouth and the seal means and to prevent bending of the cam shaft.

2. The improved portable aerating apparatus of claim 1, further comprising an annular member fitted to the lower end of the stem and defining the lower abutment surface, and wherein the cam follower protrudes through the annular member for engagement with the cam means.

3. The improved portable aerating apparatus for claim 1, wherein the operating member located outside the casing is rotatable to operate said platform raising means, at least one projection is fixed to one of said operating member and said casing and engages in at least one arcuate slot provided in the other of the operating member and the casing, said projection moving along the slot when the operating member is rotated and abutting the ends of the slot to limit the rotation thereof.

4. The improved aerating apparatus of claim 3, wherein the projection is fixed to the casing and engages in the arcuate slot which is located in a surface of the operating member facing the casing, and said member has an aperture through which the projection is visible only when the operating member is in the correct position for a bottle on the platform to be engaged properly with the aerating head.

5. The improved portable aerating apparatus of claim 4, wherein the said operating member has a shaft journalled in the casing by a journal member, and two projections in the form of pins are integral with the journal, two arcuate slots being provided in the surface of the operating member, the two projections extending into the slots, respectively.

* * * * *